UNITED STATES PATENT OFFICE.

FÉLIX FRANÇOIS BOISSELIER, OF COLOMBES, FRANCE.

SOLDER FOR ALUMINIUM.

1,344,165.     Specification of Letters Patent.     Patented June 22, 1920.

No Drawing.     Application filed February 14, 1919. Serial No. 277,096.

*To all whom it may concern:*

Be it known that I, FÉLIX FRANÇOIS BOISSELIER, citizen of the Republic of France, residing at 4 Place Galilée à Colombes, Seine, in the Republic of France, have invented new and useful Improvements in Solders for Aluminium, of which the following is a specification.

This invention relates to solder for soldering parts or articles made of aluminium or of alloys of aluminium, such as the gear cases of automobile or aviation motors.—

This solder is composed of an alloy of:

| | |
|---|---|
| Aluminium | 28 % |
| Zinc | 37.5% |
| Tin | 33 % |
| Copper | 1.5% |

The proportions of metal selected for the composition of this solder are such that the action of water on the same is not noticeable.

The copper proportion may be increased by 1%; that is to 2.5% while decreasing the zinc proportion in the same ratio; the resulting solder is more brittle.

The solder obtained according to the above formula allows all ordinary repairs to be done, such as affixing bosses of solder to a gear case, these bosses may be screw threaded without any fear and used as fixing means for the gear case. The improved solder can also be used advantageously for lining or loading different gear case parts etc.

The improved solder is very convenient in use. The parts requiring to be soldered should first be well coated and heated moderately to about 400° C.; steel spatulæ should be used for handling the solder in the operation.

The color of the soldered part is the same as that of the other parts of the gear case.

Soldering done six months ago on motors has not altered in any way either as regards color or from a mechanical point of view.

To make such solder, tin is first melted down alone; when it is liquid, copper is added to it, the mixture is then stirred with a steel spatula; when the copper is melted aluminium and afterward zinc is added thereto.

Having now described my invention, what I claim as new and desire to secure by Letters Patent is:

Solder for soldering aluminium parts or aluminium alloys composed of the following alloy: 28 per cent. of aluminium from 36.5 to 37.5 per cent. of zinc 33 per cent. of tin and from 2.5 to 1.5 per cent. of copper.

In testimony whereof I have signed my name to this specification.

FÉLIX FRANÇOIS BOISSELIER.